(12) United States Patent
Marchesotti et al.

(10) Patent No.: US 8,594,385 B2
(45) Date of Patent: Nov. 26, 2013

(54) PREDICTING THE AESTHETIC VALUE OF AN IMAGE

(75) Inventors: Luca Marchesotti, Grenoble (FR); Florent Perronnin, Domène (FR); Gabriela Csurka, Crolles (FR)

(73) Assignee: Xerox Corporation, Norwalk, CT (US)

( * ) Notice: Subject to any disclaimer, the term of this patent is extended or adjusted under 35 U.S.C. 154(b) by 343 days.

(21) Appl. No.: 13/089,504

(22) Filed: Apr. 19, 2011

(65) Prior Publication Data

US 2012/0269425 A1 Oct. 25, 2012

(51) Int. Cl.
*G06K 9/00* (2006.01)
(52) U.S. Cl.
USPC .......................................................... 382/112
(58) Field of Classification Search
USPC .......................................................... 382/112
See application file for complete search history.

(56) References Cited

U.S. PATENT DOCUMENTS

| | | | |
|---|---|---|---|
| 5,347,374 A | 9/1994 | Fuss et al. | |
| 5,357,352 A | 10/1994 | Eschbach | |
| 5,363,209 A | 11/1994 | Eschbach et al. | |
| 5,371,615 A | 12/1994 | Eschbach | |
| 5,414,538 A | 5/1995 | Eschbach | |
| 5,450,217 A | 9/1995 | Eschbach et al. | |
| 5,450,502 A | 9/1995 | Eschbach et al. | |
| 5,802,214 A | 9/1998 | Eschbach et al. | |
| 7,711,211 B2 | 5/2010 | Snowdon et al. | |
| 8,254,679 B2 * | 8/2012 | Marchesotti | 382/173 |
| 2003/0081842 A1 | 5/2003 | Buckley | |
| 2007/0005356 A1 | 1/2007 | Perronnin | |
| 2007/0258648 A1 | 11/2007 | Perronnin | |
| 2008/0069456 A1 | 3/2008 | Perronnin | |
| 2008/0285860 A1 * | 11/2008 | Datta et al. | 382/224 |
| 2008/0317358 A1 | 12/2008 | Bressan et al. | |
| 2009/0144033 A1 | 6/2009 | Perronnin et al. | |
| 2010/0040285 A1 | 2/2010 | Csurka et al. | |
| 2010/0092084 A1 | 4/2010 | Perronnin et al. | |
| 2010/0098343 A1 | 4/2010 | Perronnin et al. | |
| 2010/0318477 A1 | 12/2010 | Perronnin et al. | |
| 2011/0040711 A1 | 2/2011 | Perronnin et al. | |

OTHER PUBLICATIONS

Jain, et al. "Unsupervised texture segmentation using gabor filters," *Pattern Recogn.*, 24(12):1167-1186, 1991.
Jain, et al. "Object detection using gabor filters," *Pattern Recognition*, 30:295-309, 1997.
Ke, et al. "The design of high-level features for photo quality assessment," vol. 1, pp. 419-426, Jun. 2006.
Luo. "A training-based no-reference image quality assessment algorithm," vol. 5, pp. 2973-2976, Oct. 2004.
Luo, et al. "Photo and video quality evaluation: Focusing on the subject," in *ECCV* (3), pp. 386-399, 2008.
Lyons, et al. "Coding facial expressions with gabor wavelets," in *FG '98: Proceedings of the 3rd. International Conference on Face & Gesture Recognition*, p. 200, 1998.
U.S. Appl. No. 12/968,796, filed Dec. 15, 2010, Ah-Pine, et al.

(Continued)

*Primary Examiner* — Tom Y Lu
(74) *Attorney, Agent, or Firm* — Fay Sharpe LLP

(57) ABSTRACT

A system and method for determining the aesthetic quality of an image are disclosed. The method includes extracting a set of local features from the image, such as gradient and/or color features and generating an image representation which describes the distribution of the local features. A classifier system is used for determining an aesthetic quality of the image based on the computed image representation.

22 Claims, 9 Drawing Sheets

(56) References Cited

OTHER PUBLICATIONS

U.S. Appl. No. 12/890,049, filed Sep. 24, 2010, Skaff, et al.
U.S. Appl. No. 12/908,410, filed Oct. 20, 2010, Marchesotti, et al.
U.S. Appl. No. 12/632,107, filed Dec. 7, 2009, Marchesotti, et al.
U.S. Appl. No. 12/512,209, filed Jul. 30, 2009, Perronnin, et al.
U.S. Appl. No. 12/960,018, filed Dec. 3, 2010, Gordo, et al.
Datta, et al. "Algorithmic inferencing of aesthetics and emotion in natural images: An exposition," pp. 105-108, Oct. 2008.
Sheikh, et al. "A statistical evaluation of recent full reference image quality assessment algorithms," *IEEE Transactions on Image Processing*, 15(11), 3440-3451, Mar. 2006.
Chang, et al. "LIBSVM: a library for support vector machines," 2001.
Datta, et al. "Studying aesthetics in photographic images using a computational approach," in European Conference on Computer Vision 2006 ( ECCV ), pp. 288-301.
Datta, et al. "Learning the consensus on visual quality for next-generation image management," in Multimedia '07: Proceedings of the 15th international conference on Multimedia, pp. 533-536, 2007.
Datta, et al. "Acquine: aesthetic quality inference engine—real-time automatic rating of photo aesthetics," in *Multimedia Information Retrieval*, pp. 421-424, 2010.
Bhattacharya, et al. "Framework for photo-quality assessment and enhancement based on visual aesthetics," ACM Multimedia, Oct. 25-29, 2010.
Wang, et al. "Objective Video Quality Assessment," in *The handbook of video databases: design and applications*, Chapter 41, pp. 1041-1078. CRC press, 2003.
Perronnin, et al., "Fisher Kernels on Visual Vocabularies for Image Categorization," in Proc. of the IEEE Conf on Computer Vision and Pattern Recognition (CVPR), Jun. 2007.
Zheng, et al., "Tour the World: Building a web-scale landmark recognition engine," IEEE Computer Society Conference, 2009.
Jegou, et al., "Improving Bag-Of-Features for Large Scale Image Search," in IJCV, 2010.
Csurka, et al., "Visual Categorization with Bags of Keypoints," ECCV *Workshop on Statistical Learning in Computer Vision*, 2004.
Jegou, et al., "Hamming embedding and weak geometric consistency for large scale image search," in ECCV 2008.
Laaksonen, et al., "PicSOM self-organizing image retrieval with MPEG-7 content descriptions," IEEE Transactions on Neural Networks, vol. 13, No. 4, 2002.
Ballard. "Generalizing the hough transform to detect arbitrary shapes," in M. A. Fischler and O. Firschein, editors, *Readings in Computer Vision: Issues, Problems, Principles, and Paradigms*, pp. 714-725, 1987.
Everingham, et al. "The PASCAL Visual Object Classes Challenge," VOC 2008 Results.
Farquhar, et al. "Improving 'bag-of-keypoints' image categorization, Technical report," University of Southampton, 2005.
Hsu, et al. "Blurred image detection and classification," in *MMM*, 2008.
Jaakkola, et al. "Exploiting generative models in discriminative classifiers," in *NIPS*, 1999.
Krishnapuram, et al. "Sparse multinomial logistic regression: Fast algorithms and generalization bounds" *IEEE TPAMI*, 2005.
Lazebnik, et al. "Beyond bags of features: Spatial pyramid matching for recognizing natural scene categories," in *CVPR*, 2006.
Levin. "Blind motion deblurring using image statistics," in *NIPS*, 2006.
Li, et al. "Aesthetic quality assessment of consumer photos with faces," *ICIP*, 2010.
Liu, et al. "A similarity measure between unordered vector sets with application to image categorization," in *CVPR*, 2008.
Lowe. "Distinctive image features from scale-invariant keypoints," *IJVC*, 2004.
Rubner, et al. The earth mover's distance as a metric for image retrieval. *IJVC*, 2000.
U.S. Appl. No. 12/693,795, filed Jan. 26, 2010, Skaff, et al.
U.S. Appl. No. 12/859,898, filed Aug. 20, 2010, Perronnin, et al.
Sivic, et al., "Video Google: A text retrieval approach to object matching in videos," in *ICCV*, 2003.
Tai, et al. "Detail recovery for single-image defocus blur," *IPSF Trans. on Computer Vision and Applications*, 2009.
Tong. "Blur detection for digital images using wavelet transform," *in Proceedings of IEEE International Conference on Multimedia and Expo*, pp. 17-20, 2004.
Obrador, et al. "The role of image composition in image aesthetics," Sep. 26-29, 2010.
Perronnin, et al. "Large-scale image retrieval with compressed fisher vectors," in *CVPR*, 2010.
Perronnin, et al. "Improving the fisher kernel for large-scale image classification," in *ECCV*, 2010.
Mikolajczyk, et al. "A Performance Evaluation of Local Descriptors," Proceedings of the Conference on Computer Vision and Pattern Recognition (CVPR), Jun. 2003.

\* cited by examiner

PREDICTING THE AESTHETIC VALUE OF AN IMAGE

CROSS REFERENCE

Cross reference is made to copending application Ser. No. 13/089,460, filed on Apr. 19, 2011, entitled IMAGE QUALITY ASSESSMENT, by Luca Marchesotti and Rodrigue Nkoutche, the disclosure of which is incorporated herein by reference in its entirety.

BACKGROUND

Aspects of the exemplary embodiments disclosed herein relate to a system and method for the assessment of quality of photographic images.

Digital photographic images are produced by professional photographers and amateurs in increasing numbers. Such images may be made accessible through a public website where they can be rated for quality and other characteristics by viewers of the website. There has been considerable effort in the field of image quality assessment to design quality metrics that can predict the perceived image quality automatically. See, for example, Z. Wang, et al., *The handbook of video databases: design and applications*, Chapter 41, pages 1041-1078, CRC press, 2003. One objective has been to extract descriptors from the digital image with good correlation with human preference. See, H. Sheikh, et al., "A statistical evaluation of recent full reference image quality assessment algorithms, *IEEE Transactions on Image Processing*, 15(11): 3440-3451, November 2006. The presence or absence of specific signal level degradations such as random or structured noise (e.g., salt and pepper noise, jpeg artifacts, ringing) and blur were used in the past to define the quality of a photographic image. However, high definition digital sensors are now readily available which allow photographers to overcome such degradations. Image quality assessment has focused more recently on the assessment of high level features that go beyond such image qualities which comply with best practices, such as "does the image obey the rule of thirds?" See, R. Datta, et al., "Studying aesthetics in photographic images using a computational approach," *ECCV* (3), pp. 288-301, 2006 (hereinafter, "Datta 2006"); R. Datta, et al., "Learning the consensus on visual quality for next-generation image management," *MULTIMEDIA '07: Proc. 15th Intern'l Conf. on Multimedia*, pp. 533-536, 2007 (hereinafter, "Datta 2007"); and R. Datta, et al., "Algorithmic inferencing of aesthetics and emotion in natural images: An exposition," *15th IEEE Intern'l Conf. on Image Processing*, pp. 105-108, October 2008 ("Datta 2008").

The features which relate to image quality are often referred to as aesthetic features, because they are designed for capturing specific visual elements, such as color combinations, composition, framing, and the like which are not directly related to the content of the image but which have an impact on the perceived quality of the image. Aesthetic feature extraction schemes are described, for example, in the above-mentioned Datta references and in Y. Ke, X. Tang, and F. Jing, "The design of high-level features for photo quality assessment," in *CVPR*, 2006. The features used in these methods are typically created by taking into account the perceptual factors that capture visual preference. These aesthetic features can be split into two broad classes: low-level features and high-level features.

Among the many low-level features available to describe light and color, the ones which are most popular involve simple statistics evaluated over the entire image. In particular, mean and standard deviation are in general computed in several perceptually and non-perceptually coherent color spaces such as Lab, RGB, YUV or HSV. Other descriptors are based on blur estimation techniques such as where a blurred image is modeled as the result of Gaussian smoothing filter applied to an otherwise sharp image. Other low level features calculate the dynamic range of an image by evaluating its grayscale histograms. Colorfulness can be assessed by extracting 3-D color histograms and by calculating the Earth Mover Distance of each from a reference chromatic model.

High-level features focus on the analysis of objects and homogeneous image regions. Typical approaches are based on segmentation techniques, saliency extraction methods, or geometric contexts. The underlying idea is to capture composition and framing properties by looking at the position of the main subject or of dominant regions of the picture. In particular, the distance between object centroids and reference points in the image (e.g. four intersection points specified by the rule of thirds) can be calculated.

Despite the proliferation of annotated image data available through social networks, photo sharing websites, and the like, which could be used as training data, challenges for image quality assessment remain. First, such data is annotated with an intrinsic noise because when dealing with human preference, unanimous consensus is rare. Instead, general trends with varying proportions of outliers are often observed. While the amount of data used to train an automated system could be increased, this does not always solve the problem. Another challenge concerns the design of features to capture human preference. The features currently in use do not always correlate well with human perception. In other words, they are not powerful enough to capture all the required visual information for quality.

There remains a need for a system and method which can improve image quality assessment.

INCORPORATION BY REFERENCE

The following references, the disclosures of which are incorporated herein by reference in their entireties, are mentioned:

The following references relate to aspects of color in images: U.S. application Ser. No. 12/890,049, filed Sep. 24, 2010, entitled SYSTEM AND METHOD FOR IMAGE COLOR TRANSFER BASED ON TARGET CONCEPTS, by Sandra Skaff, et al.; U.S. patent application Ser. No. 12/908,410, filed Oct. 20, 2010, entitled CHROMATIC MATCHING GAME, by Luca Marchesotti, et al.; U.S. patent application Ser. No. 12/632,107, filed Dec. 7, 2009, entitled SYSTEM AND METHOD FOR CLASSIFICATION AND SELECTION OF COLOR PALETTES, by Luca Marchesotti, et al.

The following references relate generally to visual classification and image retrieval methods: U.S. Pub. No. 2007005356, published Jan. 4, 2007, entitled GENERIC VISUAL CATEGORIZATION METHOD AND SYSTEM, by Florent Perronnin; U.S. Pub. No. 20070258648, published Nov. 8, 2007, entitled GENERIC VISUAL CLASSIFICATION WITH GRADIENT COMPONENTS-BASED DIMENSIONALITY ENHANCEMENT, by Florent Perronnin; U.S. Pub. No. 20080069456, published Mar. 20, 2008, entitled BAGS OF VISUAL CONTEXT-DEPENDENT WORDS FOR GENERIC VISUAL CATEGORIZATION, by Florent Perronnin; U.S. Pub. No. 20080317358, published Dec. 25, 2008, entitled CLASS-BASED IMAGE ENHANCEMENT SYSTEM, by Marco Bressan, et al.; U.S. Pub. No. 20090144033, published Jun. 4, 2009, entitled OBJECT COMPARISON, RETRIEVAL, AND CATEGORIZATION METHODS AND APPARATUSES, by Yan Liu, et al.; U.S. Pub. No. 20100040285, published Feb. 18, 2010, entitled SYSTEM AND METHOD FOR OBJECT CLASS LOCALIZATION AND SEMANTIC CLASS BASED IMAGE SEGMENTATION, by Gabriela Csurka, et al.; U.S. Pub. No. 20100092084, published Apr. 15, 2010, entitled REPRESENTING DOCUMENTS WITH RUNLENGTH HISTOGRAMS, by Florent Perronnin, et al.; U.S. Pub. No. 20100098343, published Apr. 22, 2010, entitled MODELING IMAGES AS MIXTURES OF IMAGE MODELS, by Florent Perronnin, et al.; U.S. Pub. No. 20100318477, published Dec. 16, 2010, entitled FAST AND EFFICIENT NONLINEAR CLASSIFIER GENERATED FROM A TRAINED LINEAR CLASSIFIER, by Florent Perronnin, et al., U.S. Pub. No. 20110040711, published Feb. 17, 2011, entitled TRAINING A CLASSIFIER BY DIMENSION-WISE EMBEDDING OF TRAINING DATA, by Florent Perronnin, et al.; U.S. application Ser. No. 12/512,209, filed Jul. 30, 2009, entitled COMPACT SIGNATURE FOR UNORDERED VECTOR SETS WITH APPLICATION TO IMAGE RETRIEVAL, by Florent Perronnin, et al.; U.S. patent application Ser. No. 12/693,795, filed on Jan. 26, 2010, entitled A SYSTEM FOR CREATIVE IMAGE NAVIGATION AND EXPLORATION, by Sandra Skaff, et al.; U.S. application Ser. No. 12/859,898, filed on Aug. 20, 2010, entitled LARGE SCALE IMAGE CLASSIFICATION, by Florent Perronnin, et al.; Perronnin, F., Dance, C., "Fisher Kernels on Visual Vocabularies for Image Categorization," in Proc. of the IEEE Conf on Computer Vision and Pattern Recognition (CVPR), Minneapolis, Minn., USA (June 2007); Yan-Tao Zheng, Ming Zhao, Yang Song, H. Adam, U. Buddemeier, A. Bissacco, F. Brucher, Tat-Seng Chua, and H. Neven, "Tour the World: Building a web-scale landmark recognition engine," IEEE Computer Society Conference, 2009; Herve Jegou, Matthijs Douze, and Cordelia Schmid, "Improving Bag-Of-Features for Large Scale Image Search," in IJCV, 2010; G. Csurka, C. Dance, L. Fan, J. Willamowski and C. Bray, "Visual Categorization with Bags of Keypoints," ECCV Workshop on Statistical Learning in Computer Vision, 2004; Herve Jegou, Matthijs Douze, and Cordelia Schmid, "Hamming embedding and weak geometric consistency for large scale image search," in ECCV 2008; Jorma Laaksonen, Markus Koskela, and Erkki Oja, "PicSOM self-organizing image retrieval with MPEG-7 content descriptions," IEEE Transactions on Neural Networks, vol. 13, no. 4, 2002; and F. Perronnin, J. Sanchez, and T. Mensink, "Improving the fisher kernel for large-scale image classification," in ECCV 2010.

U.S. Application Ser. No. 12/968,796, filed on Dec. 15, 2010, entitled SYSTEM AND METHOD FOR MULTIMEDIA INFORMATION RETRIEVAL, by Julien Ah-Pine, et al., discloses a system and method for information retrieval based on text-based and image-based parts of a query.

Methods for determining aspects of image quality are described, for example, in U.S. Pat. Nos. 5,357,352, 5,363,209, 5,371,615, 5,414,538, 5,450,217; 5,450,502, 5,802,214 to Eschbach, et al., U.S. Pat. No. 5,347,374 to Fuss, et al., U.S. Pub. No. 2003/0081842 to Buckley, and U.S. Pat. No. 7,711,211 to Snowdon, et al.

BRIEF DESCRIPTION

In accordance with one aspect of the exemplary embodiment, a method for determining the aesthetic quality of an input image includes extracting a set of local features from the input image, and generating an image representation which describes the distribution of the local features. An aesthetic quality of the image based on the computed image representation is determined with a classifier system. One or more of the steps of the method may be performed with a processor.

In accordance with another aspect, a system for determining the aesthetic quality of an input image includes a feature extractor for extracting a set of local features from the input image, a representation generator for generating an image representation which describes a distribution of the extracted local features. The representation generator generates local descriptors based on low level features extracted from patches of the image and aggregating the local descriptors to form the image representation. A classifier system determines an aesthetic quality of the input image based on the computed image representation.

In accordance with another aspect, a method includes for each of a set of training images, partitioning the training image into a plurality of image regions using a spatial pyramids partitioning model, the partitioning including partitioning the image into three vertically spaced regions, each of one third of a height of the image, extracting local descriptors from each of the image regions, and modeling the extracted local descriptors of each image region using a probabilistic model to generate a corresponding region representation comprising probabilistic model component values for a set of probabilistic model components. The region representations are combined to generate an image representation for the training image. An image quality value for the training image is extracted, based on at least one manually-assigned aesthetic score for the training image. A classifier system is trained to determine an aesthetic quality of an input image based on its computed image representation, the training including applying a linear or non-linear training algorithm to the image quality values and image representations of the training images. One or more of the steps of the method may be performed with a processor.

DETAILED DESCRIPTION

Figure 1:
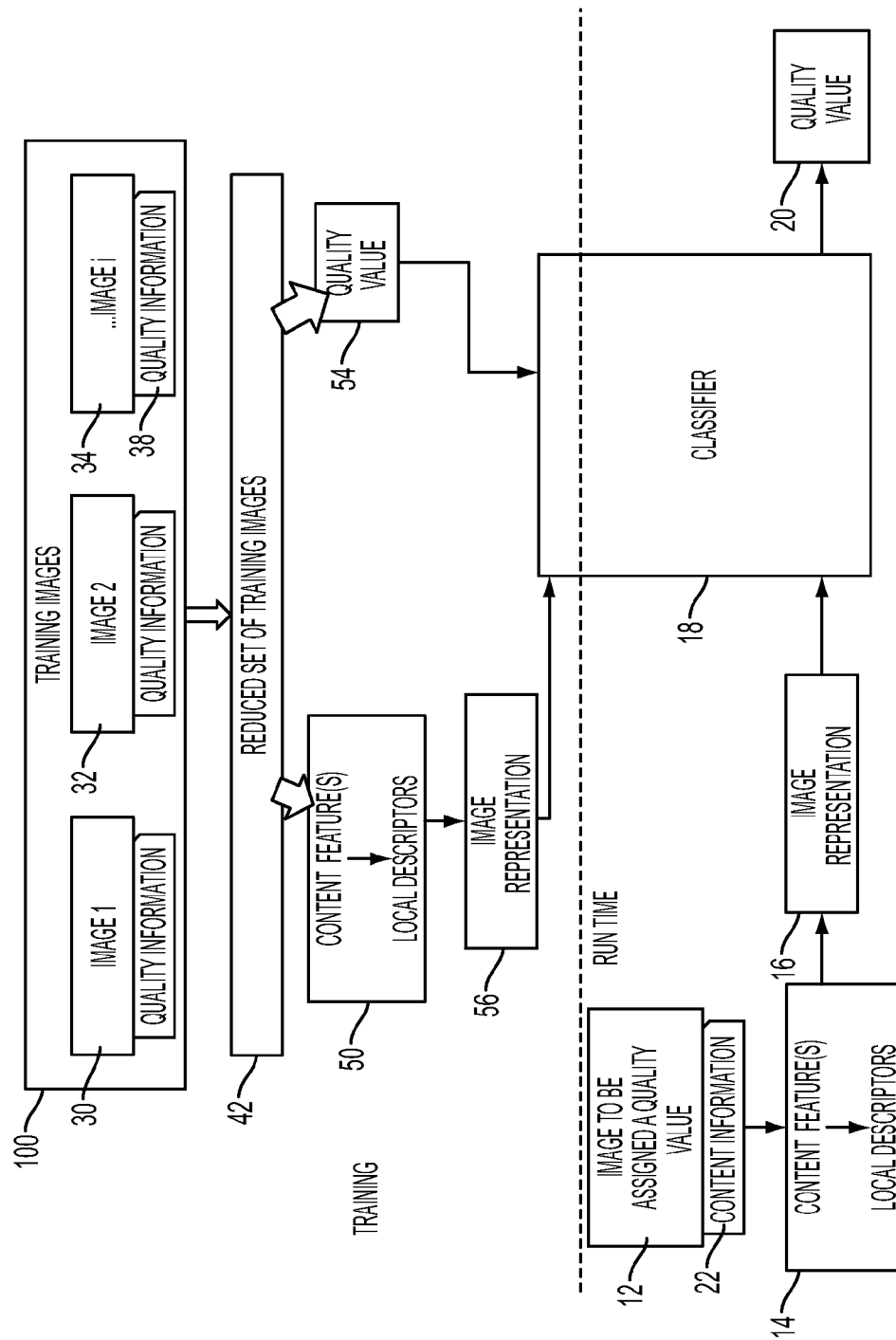
FIG. 1 is a schematic view of inputs to an exemplary classifier system during training and in use.

The exemplary embodiment relates to a computer implemented system and method for assessment of image quality. The system includes a classifier system which has been trained to output an image quality assessment based on an input image representation. The training data for the classifier system includes image representations of images and associated manually assigned image quality assessments (aesthetic values) for those images. Given a new image to be classified, its image representation is extracted and input to the classifier system which outputs a corresponding image quality assessment for the image.

In contrast to conventional work which attempts to assess image quality based on aesthetic features, the exemplary image representation relies on modeling a distribution of low-level local features in an image to assess its aesthetic quality. While a variety of vectorial image representations are contemplated as image representations, two techniques which model the distribution of feature sets using fixed-length vectorial representations are described by way of example:

1. The bag-of-visual-words (BOV) approach, described in U.S. Pub. No. 20080069456 and in G. Csurka, C. Dance, L. Fan, J. Willamowski, and C. Bray, "Visual categorization with bags of keypoints," in ECCV SLCV Workshop, 2004, hereinafter, "Csurka 2004"; and Sivic and A. Zisserman, "Video Google: A text retrieval approach to object matching in videos," in *ICCV,* 2003, hereinafter, "Sivic 2003"; and 2. The Fisher vector (FV), described in above-mentioned application Ser. No. 12/859,898 and F. Perronnin and C. Dance, "Fisher kernels on visual vocabularies for image categorization," in CVPR, 2007, hereinafter "Perronnin 2007"; and F. Perronnin, J. Sanchez, and T. Mensink, "Improving the fisher kernel for large-scale image classification," In ECCV, 2010, hereinafter "Perronnin 2010".

These techniques are similar in that they include computing for each low-level local feature type, a set of statistics and then aggregating these statistics into an image-level representation or "signature."

Techniques which model feature sets using continuous distributions such as Gaussian Mixture Models (GMM) are also contemplated. See, for example, above-mentioned application Ser. No. 12/512,209, U.S. Pub. No. 20090144033 and Y. Liu and F. Perronnin, "A similarity measure between unordered vector sets with application to image categorization," in CVPR, 2008.

Experiments performed with the BOV and FV descriptors show that these image representations perform significantly better than existing methods. The FV performs particularly well as a content-based descriptor and is shown to have little complementarity with traditional aesthetic features.

There are several instances in which such automated prediction of human preference directly from image data can be useful. For example, in image retrieval systems, the results of traditional content-based retrieval methods could be refined or integrated using the exemplary system. Also, the system may be deployed directly on cameras to make real-time suggestions on what to shoot in a given scene. As will be appreciated, the exemplary system and method may have a variety of applications which are not limited to these.

Figure 2:
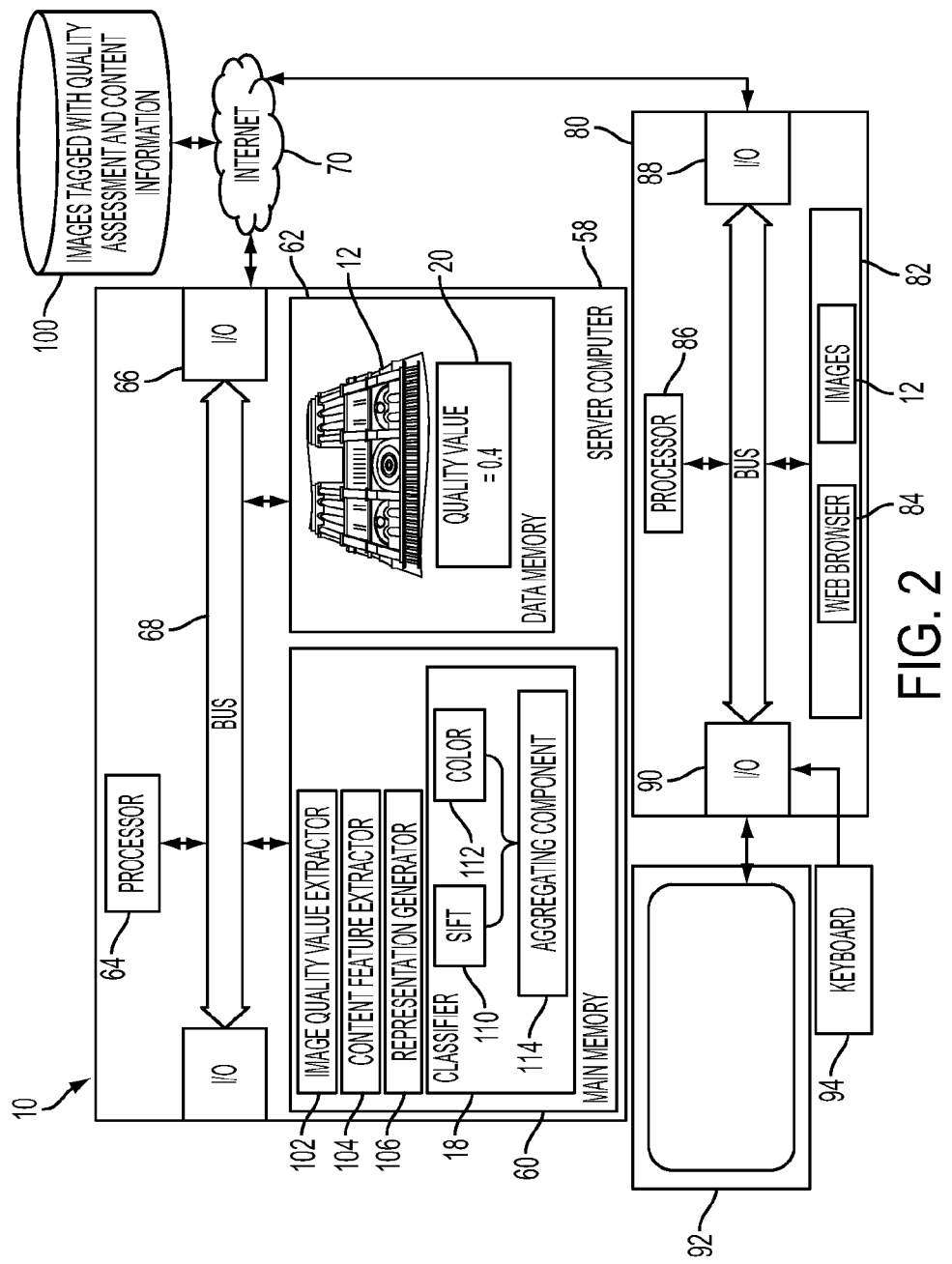
FIG. 2 is a functional block diagram of a system for assigning image quality values in accordance with one aspect of the exemplary embodiment.
Figure 3:
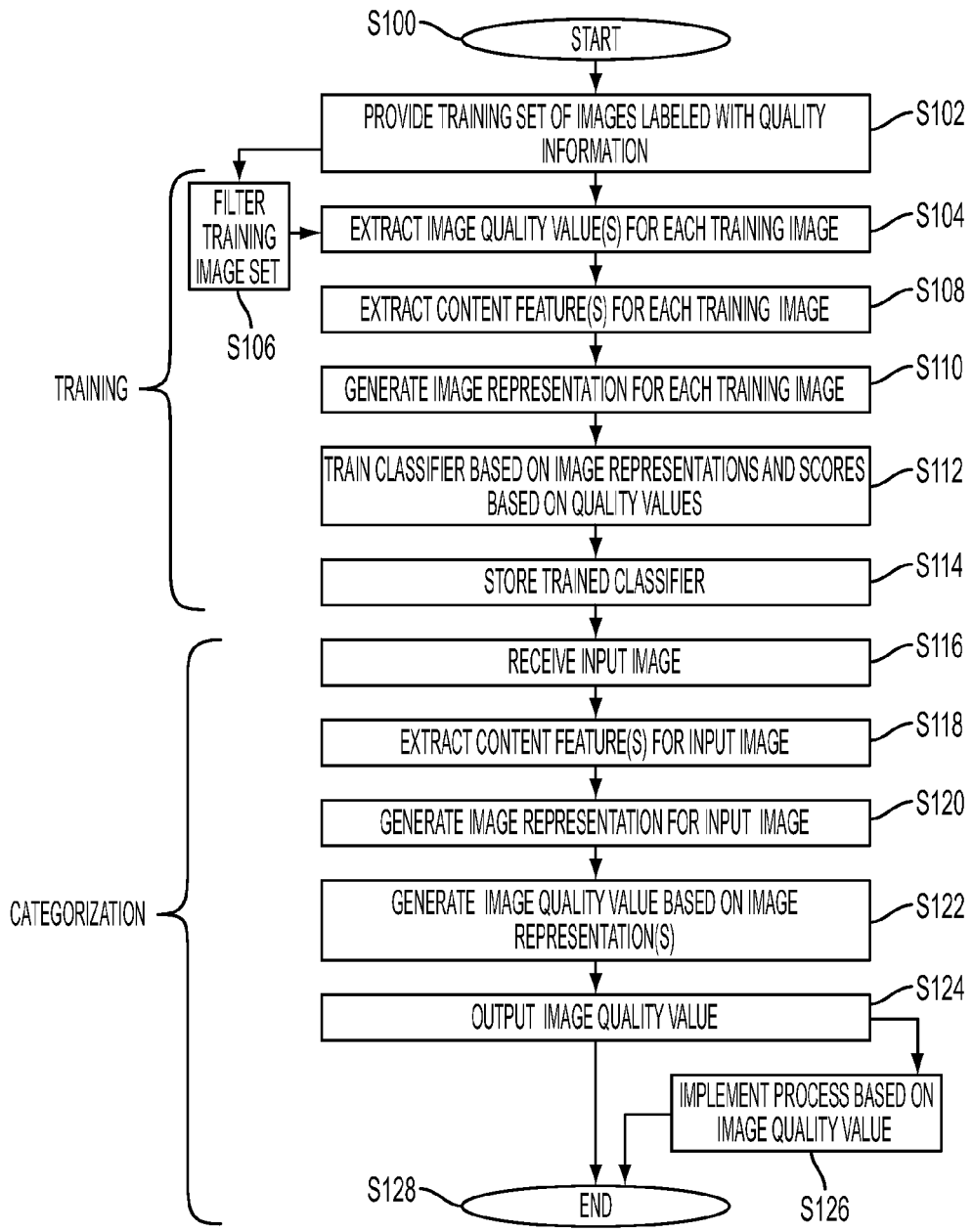
FIG. 3 is a flow diagram illustrating a method for image quality assessment, in accordance with another aspect of the exemplary embodiment.

FIG. 1 schematically illustrates aspects of the exemplary embodiments. FIG. 2 illustrates an exemplary system 10 for assigning an image quality value to an image 12, such as a photographic image. FIG. 3 illustrates an exemplary method for assigning an image quality assessment to an image which aims to provide a perceived image quality which would be in agreement with that of an average viewer. As illustrated in FIG. 1, at run time, the exemplary system 10 receives an image 12 to be assessed and generates a set of features 14 for the image 12. At least one content-based feature descriptor (image representation) 16 is generated for the image, based on the extracted features, and input to a classifier system 18. The classifier system has been trained to assign an image quality assessment 20 to the input image 12 in the form of a quality value. The image quality assessment 20 is thus an automated assessment of the quality of an image 12, which predicts the image quality which would be perceived by a set of human viewers. The image quality assessment 20 output by the present system may be a score which is a real value within a predefined range of maximum and minimum values, e.g., on a scale, for example, of from 0 to 1, where 0 represents the lowest image quality, i.e., a very bad image, and 1 represents the highest image quality, i.e., a very good image, or may be a quantized score, such as a star rating (1 star being the lowest and K stars being the highest, where K may be a predetermined maximum value from 5 to 10, for example). In other embodiment the value 20 may be a ranking (e.g., with 1 corresponding to a highest image quality, and other images in a set having higher values corresponding to lower rankings) or a verbal description of the image quality selected from a finite set of possible verbal descriptions (such as "low quality," "average quality," "good quality," and "excellent quality").

The exemplary content features 14 are low level features, such as gradient or color features. An image 12 may be assigned an image representation 16 in the form of a vector which describes the distribution of the local features in the image. The values forming the image representation 16 can be quantized, e.g., binary (0 or 1) or can be real values within a predetermined range, such as in the range [0,1].

The classifier system 18 is trained with a set of training images 30, 32, 34, etc., such as from one hundred to one million training images comprising photographs of various subjects. Each training image 30, 32, 34, includes image data comprising an array of pixels. The training images are each labeled with quality information 38, such as a score (or multiple scores) assigned by a human reviewer or set of reviewers. A reduced set 42 of training images may be selected for training, by filtering the images based on the quality information 38.

For each training image, content features 50 and a normalized quality value 54 are generated. Image representations 56 (in the same format as image representation(s) 16 of the image 12 to be categorized) are input to the classifier system 18. The classifier 18 learns to assign a quality value 20 to a new image 12 based on the computed image representation(s) 56 and associated quality value 54 of each of the training images 30, 32, 34, etc.

Turning now to FIG. 2, an exemplary environment in which the image quality system 10 operates is shown. The system 10 comprises a computing device 58 which includes memory, here illustrated as main memory 60 and data memory 62, a processor 64, such as the computer's CPU, and one or more network interfaces (I/O) 66 for communicating with other devices, all communicatively linked by a data/communication bus (or buses) 68. The computer(s) 58 may include a PC, such as a desktop, a laptop, palmtop computer, portable digital assistant (PDA), digital camera, server computer, cellular telephone, tablet computer, pager, or other computing device(s) capable of executing instructions for performing the exemplary method.

The digital processor 64 can be variously embodied, such as by a single-core processor, a dual-core processor (or more generally by a multiple-core processor), a digital processor and cooperating math coprocessor, a digital controller, or the like. In general, any device, capable of implementing a finite state machine that is in turn capable of implementing the flowchart shown in FIG. 2, can be used as the processor.

The memory or memories 60, 62 may represent any type of non-transitory computer readable medium such as random access memory (RAM), read only memory (ROM), magnetic disk or tape, optical disk, flash memory, or holographic memory. In one embodiment, the memory 60, 62 comprises a combination of random access memory and read only memory. Memory 60 may store instructions for the operation of server computer as well as for performing the exemplary method for assessing image quality described below. Memory 62 stores images 12 being processed by the exemplary method as well as the processed data 20.

The network interface 66 may comprise a modulator/demodulator (MODEM) and allows the computer to communicate with other devices via a wired or wireless links 70, such as computer network, e.g., a local area network (LAN), wide area network (WAN), such as the internet, telephone line, wired connection, or a combination thereof.

Images 12 to be quality assessed are input to the system 10 from a source 80 of images, such as a general purpose or specific purpose computing device, such as a PC, laptop, camera, cell phone, or the like, or from a non-transitory memory storage device, such as a flash drive, disk, portable hard drive, camera memory stick, or the like. In the exemplary embodiment, the source 80 is a client computing device which includes memory 82, which stores the images 12 and a web browser 84 for uploading images to a web portal hosted by the server computer 58, which is implemented by a processor 86. Memory 82 and processor 86 can be similarly configured to memory 60, 62 and processor 64. One or more interfaces 88, 90 allow the computer 80 to communicate with the system 10 and with a display device 92, such as a computer monitor, LCD screen or the like, and one or more user input devices 94, such as a touch screen, keyboard, keypad, cursor control device, or combination thereof.

A set of training images, such as training images 32, 34, 36, is stored in a database (or databases) 100. The database 100 may be stored in memory 62 or in memory accessible to the system 10, e.g., via network 70.

Images 12, 32, 34, 36 may be received by the system 10 in any convenient file format, such as JPEG, TIFF, GIF, JBIG, BMP, or other common file format used for images and which may optionally be converted to another suitable format prior to processing. Images may be individual photographs, video images, three-dimensional images, combined images which include text/graphics as well as a photograph, and the like. In general, each input digital image includes image data for an array of pixels forming the image. The image data may include colorant values, such as grayscale values, for each of a set of color separations, such as RGB, or be expressed in another other color space in which different colors can be represented. In general, "grayscale" refers to the optical density value of any single color separation, however expressed (RGB, $L^*a^*b^*$, YCbCr, etc.). The exemplary system and method are applicable to monochrome images (one color separation) as well as to multicolor images (two or more color separations). As used herein, "image data" does not include the textual information, which may accompany the image data, e.g., as metadata, an HTML tag, information in an associated file, or the like.

The system 10 includes software instructions stored in main memory 60 for performing the exemplary method illustrated in FIG. 3. These instructions are executed by the processor 64 and are illustrated as a set of components: an image quality value extractor 102, a content feature extractor 104, a representation generator 106 and the classifier system 18.

Briefly, the quality value extractor 102 extracts a quality value 54 for each training image 32, 34, 36 based on the scores(s) 38. Some training images 32, 34, 36 may have been evaluated by more than one reviewer, in which case, the quality value 54 may be based on an average or other function of the reviewer scores 38. As will be appreciated, once the classifier system 18 has been trained, component 102 is no longer needed.

The content feature extractor 104 extracts content features for the image 12, 32, 34, 36, e.g., as low level features and descriptors 14, 50 based thereon, which is/are representative of the image. The representation generator 106 generates one or more image representations (content-based feature descriptors) 16, 56 for the respective image, based on the respective content features/descriptors 14 or 50. In one embodiment, region descriptors are first extracted from regions of the image at different scales, as shown, for example, in FIG. 4. In particular, the image is partitioned into a plurality of regions 130 and then partitioned again into a larger number of regions. As will be appreciated, the region-descriptors extracted from the regions can be concatenated or otherwise aggregated to provide a single image representation 56 which is representative of the image as a whole.

The classifier system 18, having been trained with content-based image representations 56 and computed quality values 54, is able to categorize the new image 12 (which may have no associated quality information) based on its image representation(s) 16 alone (and thus not on any associated quality information). Where two or more types of low level features are used to generate image representations 16, the classifier system 18 may include two or more classifiers 110, 112, e.g., one for each feature type, and an aggregating component 114, which aggregates the two classifier scores to generate an aesthetic value for the image.

As will be appreciated, although the various software components 102, 104, 106, 18 are described as separate modules, one or more of these may be separated into additional modules or combined. Some of the components may work on the input of a prior module. In some cases, the image data or information extracted therefrom may be returned to a prior module for further processing.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

As will be appreciated, FIG. 2 is a high level functional block diagram of only a portion of the components which are incorporated into a computer system 10, 80. Since the configuration and operation of programmable computers are well known, they will not be described further.

FIG. 3 illustrates a method for image quality assessment which can be performed with the system of FIG. 2. The method begins at S100.

At S102, a set of training images 32, 34, 36 is provided. The training images 32, 34, 36 may be associated with textual information, e.g., in the form of a tag or list, which includes a quality score(s) 38.

At S104, a quality value 54 for each training image is extracted, e.g., from quality information 38 (by the extractor 102). In one embodiment, the (averaged) user scores 38 may be quantized, e.g., binarized, by selecting a threshold score th and images<the threshold are then labeled as bad (e.g., −1) and the rest of the images, i.e., those images≥the threshold th are labeled good (e.g., +1). In another embodiment, the training images may optionally be filtered (S106) to provide a reduced set of training images 42, e.g., by removing images which exceed a first threshold quality value and which also are below a second, higher threshold. This removes the borderline images.

At S104, images are assigned a quality score 54, for example, the filtered images≤the first threshold are labeled as bad (e.g., −1) and the rest of the images, i.e., those images≥the second threshold are labeled good (e.g., +1).

At S108, content features and local descriptors 50 based thereon are extracted (by the extractor 104) from the (optionally filtered) set of training images 32, 34, 36.

At S110, an image representation 56 is generated (by the representation generator 106) for each training image 32, 34, 36, based on the extracted local descriptors 50.

At S112, the classifier system 18 is trained based on the quality values 54 extracted at S104 and the respective image representations 56 generated at S110. At S114, the parameters of the trained classifier system are stored in memory 60.

At S116, a new image 12 (input image) is input to the system 10, e.g., one which lacks any quality information 38.

At S118, content-based features and local descriptors 14 based thereon are extracted from the new image 12 (by the extractor 104).

At S120, an image representation 16 is generated (by the representation generator 106) for the new image 12, based on the local descriptors 14 extracted at S120.

At S122, an image quality value 20, e.g., a score, is generated based on the image representation 16 for the new image 12, using the trained classifier system 18. As noted above, the quality value 20 may be a quantized, e.g., binary value (e.g., +1, −1), which designates the image 12 as good or bad, in terms of quality, or may be a real value, e.g., in the range of 0 to 1 or 1 to 10, or the like, and need not be in the same format as scores 38 or quality values 54.

At S124, the image quality value 20 is output, e.g., to a memory storage device 62 resident on the server computer 10 or output via I/O device 66 to an external device, such as external memory, a client device 80, or a printer, a display device 92, or other external output device.

At S126, the quality value 20 may be used as an input to another computer implemented process, such as an image retrieval process, which is based in part on the quality scores of images that are retrieved as responsive to a query. The method ends at S128.

As will be appreciated, once the classifier system 18 has been trained, there is no need to repeat steps S104-S114 for each new image. Additionally, not all the steps need be performed in the order shown.

The method illustrated in FIG. 3 may be implemented in a computer program product that may be executed on a computer. The computer program product may comprise a non-transitory computer-readable recording medium on which a control program for implementing the method is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 3, can be used to implement the method.

Various aspects of the system and method will now be described in greater detail.

In the following, the terms "optimization", "minimization", and similar phraseology are to be broadly construed as one of ordinary skill in the art would understand these terms. For example, these terms are not to be construed as being limited to the absolute global optimum value, absolute global minimum, or so forth. For example, minimization of a function may employ an iterative minimization algorithm that terminates at a stopping criterion before an absolute minimum is reached. It is also contemplated for the optimum or minimum value to be a local optimum or local minimum value.

The Training Images

The image datasets which are used to study aesthetics typically consist of images gathered from websites like photo.net—a pioneer network of amateur photographers that share, tag and rate online pictures with a variety of different subjects. Other similar websites which include datasets are available on the world wide web (www) at dpchallenge.com; terragalleria.com; and hotornot.com. One or more of these or other database(s) of images may be used to supply the set of training images 100. As will be appreciated the training images should be representative of a wide range of content (and image quality) of images.

Each of the images is annotated with one or more image quality labels 38. In the exemplary embodiment, the quality values 54 of the training images 32, 34, 36 are derived from image quality scores 38 (e.g., numerical quality scores, rankings, user ratings) associated with the images, e.g., obtained from a photo sharing website. Social networks often have an annotation policy which can include textual labels ("like it," "don't like it") or a scale of numeric values (ratings). For example, on the photo.net website, users can rate images with a score between 1 (Ugly) and 7 (Beautiful). The users of this website are provided by the site administrators with the following guidelines: "Reasons for a rating closer to 7: a) it looks good, b) it attracts/holds attention, c) it has an interesting composition, d) it has great use of color, e) (if photojournalism) contains drama, humor, impact, f) (if sports) peak moment, struggle of athlete." The ratings can be converted to a numerical score if the ratings are in the form of selectable text answers, such as "like it."

In some embodiments, at least some or all of the images 32, 34, 36 which are used in training have more than one score, such as images with at least five or at least ten scores 38. An average, such as a mean, median, or mode of these scores can be taken as the image quality value 54. In some embodiments, outliers, e.g. scores 38 which differ by more than one or two standard deviations from the mean, may be excluded from the computation of the quality value 54.

The scores 38 assigned to the training images by the reviewers are content independent, i.e., an image of a flower could be given a score of 1 or 7, depending on the aesthetic value of the image, as determined by the reviewer. Put another way, given a manually applied image quality score 38, an average of a set of such user scores, a quality value 54, or an image quality value 20 output by the classifier system 18, it is impossible to identify the semantic content of the image associated with the score, i.e., it cannot be determined whether the image has a probability of containing a person, flower, landscape, or any of the other semantic classes conventionally assigned to images to describe their content, based solely on the score information.

The classifier system 18 can be trained with raw scores 38 from the tags or the scores may be binarized or otherwise quantized (e.g., into three or more quantization levels). In one embodiment, for each image i, the average of the scores 38 available for this image $q_{av}(i)$ is computed. Two thresholds $\theta_1 = +\delta/2$ and $\theta_2 = -\delta/2$ are established, where $\mu$ can have a value about the middle of the range of user scores, such as about the median score, and $\delta$ is a suitable number which determines what proportion of the images are in a middle, intermediate range. This essentially creates three ranges. Then each image is annotated with label "good" (+1) if $q_{av}(i) \geq \theta_1$ and "bad" (−1) if $q_{av}(i) \leq \theta_2$. Images 32, 34, 36 which are in the middle range, where $\theta_2 < q_{av}(i) < \theta_1$ are thus filtered out and ignored, for purposes of training the classifier system. The value of $\delta$ may depend on the size of the training set—if $\delta$ is too large, it will not be possible to have a reasonable number of good and bad images. If too small, there may be too many inconclusive images in the set to train the classifier system accurately. As an example, $\mu$ may be about 3-6, e.g., about 5, and $\delta$ may be from 0.5 to 3, such as from 1-2, in the case where possible scores range from 1-7. In this case, $\delta < 4$ or there would be no images classed as good. As will be appreciated, the score used to set the threshold (5 in this example) can be varied, based on the range of scores assigned by users and may be selected such there are approximately equal numbers of scores $q_{av}(i)$ labeled "good" and "bad."

The binary values are used as the quality values 54 of the respective images for training the classifier system. It is to be appreciated, however, that quantized quality values 54 may be generated by other methods, for example those which result in more than 2 possible scores, such as 3, 4, or more possible scores. In yet other embodiments, the averaged scores 38 are used as the quality values 54.

Extraction of Image Representations

The exemplary embodiment assumes that the image aesthetic value assigned to an image 12 is dependent on the semantic content of the image. Surprisingly, as demonstrated in the examples below, using content features 14 which describe the content of the image 12 can be adequate, without further information, for providing an assessment of its quality which is in good agreement with human observations of image quality and which can be more accurate than existing systems which are based on traditional aesthetic features. The examples below demonstrate that the aesthetic properties of an image can be modeled using a distribution of its low-level local features.

Figure 4:
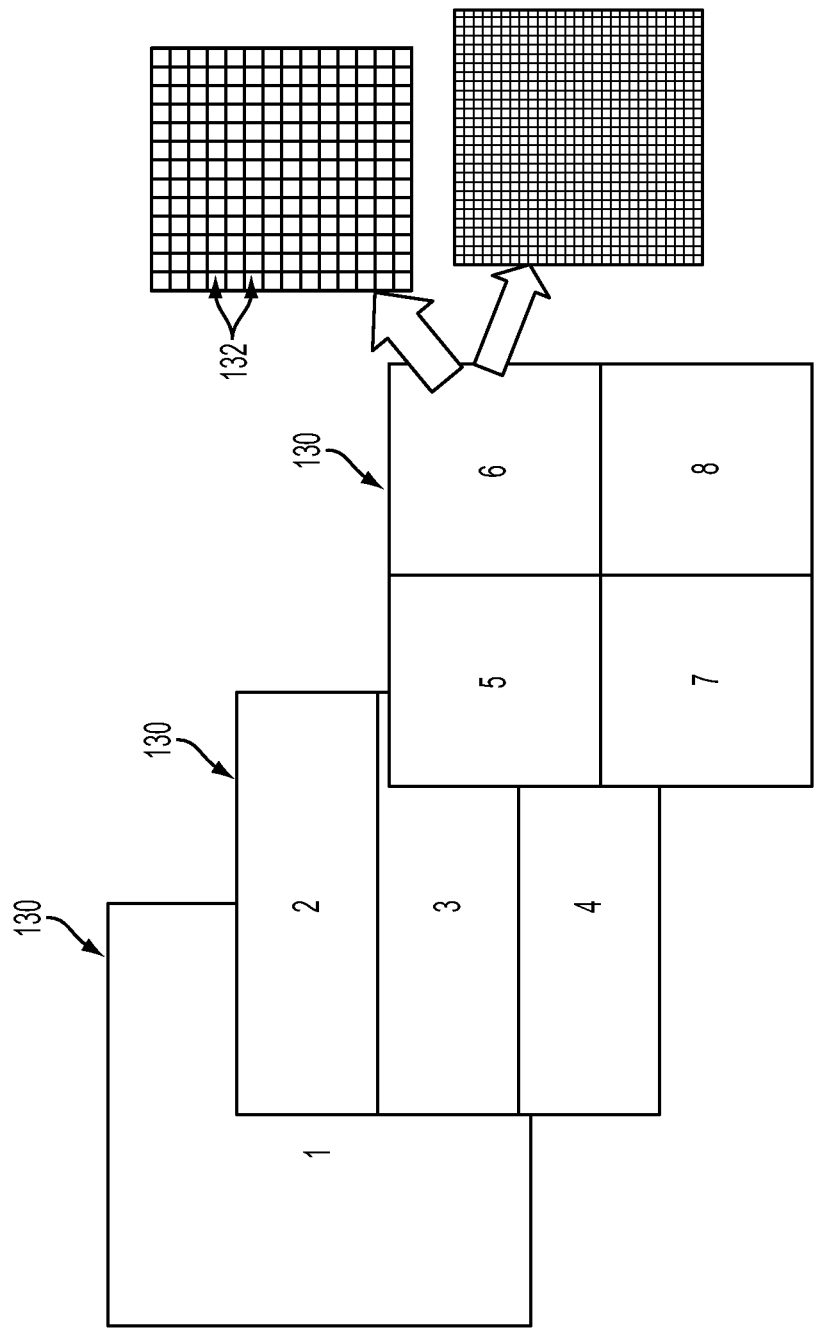
FIG. 4, illustrates generation of descriptors by region of an image.

The feature extraction (S104, S118) may proceed as follows: First, the image may be partitioned into regions 130 at multiple scales (FIG. 4). Then, for each region 130, a set of patches 132 is extracted, which can also be at multiple scales. For each patch, low-level features (in the form of a local descriptor) are extracted. An image representation 16, 56 of the image is then generated, based on the extracted local descriptors. The image is thus described by a representation which is based on statistics generated for the small patches of the image.

Partitioning of the Image

In the illustrative embodiment, a partitioning operation is first performed to partition the input image 12, 32, 34, 36 into a plurality of image regions 130. In the embodiment shown in FIG. 4, for example, 8 region-level descriptors (numbered 1-8) are extracted per image: one for the whole image, three for the top, middle and bottom regions, respectively and four for each of the four quadrants. Such a pyramid of descriptors can encode information about the image composition. For example, the three vertically-spaced regions 2, 3, and 4, which each encompass about one third of the height of the image, can indirectly provide information which correlates with a rule of thirds evaluation. This is followed by an operation of extracting local descriptors from a set of patches 132 defined in each image region 130.

Extraction of Patches

In the exemplary embodiment, multiple patches are extracted from each of the regions 130 of the image 12, 32, 34, 36. The patches can be obtained by image segmentation, by applying specific interest point detectors, by considering a regular grid, or simply by random sampling of image patches. For example, at least about 100 patches 132 are extracted from each region 130. More generally, over the image as a whole, at least 1000 and in some cases, at least 10,000 patches may be extracted. The number of patches can be up to 100,000 or more, depending on the size of the image file.

Each patch includes an array of pixels, such as at least 100 pixels or at least 500 pixels. In the exemplary embodiment, each patch includes less than 50,000 pixels and in one embodiment, less than 10,000 pixels, e.g., about 1000 pixels, although other sizes of patches 132 are contemplated. As will be appreciated, these can be representative pixels, since not all the pixels of the input image need to be considered.

Extraction of Low Level Features

For each patch 132, low level features are extracted and used to generate a local descriptor for each patch, such as a vector. The low level features which are extracted from the patches are typically quantitative values that summarize or characterize aspects of the respective patch, such as spatial frequency content, an average intensity, color characteristics (in the case of color images), gradient values, and/or other characteristic values. In some embodiments, at least about fifty low level features are extracted from each patch; however, the number of features that can be extracted is not limited to any particular number or type of features for example, 1000, 10,000, or 100,000 low level features could be extracted depending on computational capabilities. In the exemplary embodiment, the low level features include local (e.g., pixel) color statistics, and texture. For color statistics, local RGB statistics (e.g., mean and standard deviation) may be computed. For texture, gradient orientations (representing a change in color) may be computed for each patch as a histogram to generate gradient feature descriptors, such as Scale Invariant Feature Transform (SIFT) descriptors (SIFT-like features). In the exemplary embodiment two (or more) types of low level features, such as color and texture, are separately extracted and the high level representation of the patch or image is based on a combination (e.g., a sum or a concatenation) of two descriptors, one for each feature type.

In the exemplary embodiment, SIFT descriptors, as described by Lowe, in "Object Recognition From Local Scale-Invariant Features," International Conference on Computer Vision (ICCV), 1999, are computed on each patch. SIFT descriptors are multi-image representations of an image neighborhood, such as Gaussian derivatives computed at, for example, eight orientation planes over a four-by-four grid of spatial locations, giving a 128-dimensional vector (that is, 128 features per features vector in these embodiments). Other descriptors or feature extraction algorithms may be employed to extract features from the patches. Examples of some other suitable descriptors are set forth by K. Mikolajczyk and C. Schmid, in "A Performance Evaluation Of Local Descriptors," Proceedings of the Conference on Computer Vision and Pattern Recognition (CVPR), Madison, Wis., USA, June 2003, which is incorporated in its entirety by reference.

In one illustrative example employing SIFT features, the features are extracted from 32×32 pixel patches on regular grids (every 16 pixels) at five scales, to provide 128 dimensional SIFT descriptors. Other suitable features include simple 96-dimensional color features in which a patch is subdivided into 4×4 sub-regions and in each sub-region the mean and standard deviation are computed for the three R, G and B channels. The number of features is optionally reduced, e.g. to 64 dimensions, using Principal Component Analysis (PCA).

For each type of low-level local feature, a set of statistics is computed for each patch in the form of a local descriptor. The statistics are aggregated to generate a region level or image-level representation. For computational efficiency reasons, two techniques for generating image representations which model the distribution of feature sets using fixed-length vectorial representations can be employed: the bag-of-visual-words and the Fisher vector (FV). While the BOV and FV have been successfully applied to semantic tasks such as object/scene retrieval, image classification/annotation or object localization, they have not been used to model image quality.

The exemplary low-level features extracted from the patches 132 can tell a significant amount about the local properties of an image, for example, whether the patch contains sharp edges or whether the color of a patch is saturated or not. Moreover, aggregating this information into an image-level representation provides an opportunity to consider the global composition of the image, as in whether the image has a mixture of sharp patches and blurry ones or whether there is a dominant color or a mixture of colors. Finally, using the spatial pyramid framework (FIG. 4) enables the spatial layout to be taken into account, which is a valuable feature for aesthetic prediction.

1. Bag-Of-Visual-Words (BOV)

In the BOV representation an image (or region) is described by a histogram of quantized local features. (See, for example, Csurka 2004, Sivic 2003, U.S. Pub. No. 20080069456) More precisely, given an (unordered) set of the local descriptors, such as set of SIFT descriptors or color descriptors extracted from a training or test image, a BOV histogram is computed per region 130. These region-level representations can then be concatenated or otherwise aggregated to form an image representation (e.g., one for SIFT features and one for color features).

During the training phase, a visual vocabulary, i.e., a set of prototypical features, is first learned by automatically clustering a large number of local descriptors from different images, using for example, K-means. Each patch local descriptor (e.g., a 96 or 64 dimensional vector) is then assigned to a nearest cluster and a histogram of the assignments can be generated. In other approaches, a probabilistic framework is employed. For example, it is assumed that there exists an underlying generative model, such as a Gaussian Mixture Model (GMM), from which all the vectors are emitted. A Gaussian Mixture Model (GMM) can be used to model the distribution of local features, i.e. there is a probabilistic visual vocabulary. Each Gaussian (function) in the GMM can be identified with a visual word and the clustering of the local descriptors can be performed through standard EM learning of the GMM parameters (mean and covariance of each of the Gaussians and weight of each Gaussian (function) in the GMM). The GMM vocabulary provides a principled way to cope with assignment uncertainty as each local feature is assigned with a probability to all visual words. (see, e.g., J. Farquhar, S. Szedmak, H. Meng, and J. Shawe-Taylor, "Improving "bag-of-keypoints" image categorisation," Technical report, University of Southampton, 2005). The number of Gaussians in the GMM can be, for example, at least about 100, e.g., at least 10,000. The number can be up to 100,000 and in one embodiment, is less than 10,000, such as about 2000.

In either case, each visual word in the vocabulary corresponds to a grouping of typical low-level features. The visual words may each correspond (approximately) to a mid-level image feature such as a type of visual (rather than digital) object (e.g., ball or sphere, rod or shaft, etc.), characteristic background (e.g., starlit sky, blue sky, grass field, etc), or the like.

Given an image to be classified, each extracted feature vector (local descriptor) is assigned to its closest visual word (cluster) in the previously trained vocabulary or to all visual words in a probabilistic manner in the case of a stochastic model. In the exemplary embodiment, the set of local descriptors of a given image (or of each region 130) is transformed into a fixed-length histogram representation by counting the number of local descriptors assigned to each visual word.

2. Fisher Vector

In this embodiment, a Fisher vector (FV) representation for each image region 130 is computed. The Fisher vector representations for the various regions are then concatenated or otherwise aggregated to form an image representation for the overall image 12, 32, 34, 36. The Fisher Vector extends the BOV by going beyond counting (0-order statistics) and by encoding statistics (up to the second order) about the distribution of local descriptors assigned to each visual word (see, T. Jaakkola and D. Haussler, "Exploiting generative models in discriminative classifiers," in *NIPS*, 1999, hereinafter Jaakkola; and Perronnin 2007, U.S. application Ser. No. 12/859,898 and Perronnin 2010).

An illustrative example of computing a Fisher vector representation for an image (or image region) is described. Let $X=\{x_t, t=1, \ldots, T\}$ be the set of local descriptors extracted from T patches of an image (or image region). It is assumed here that the generation process of X can be modeled by a probability density function $u_\lambda$, with parameters $\lambda$. In illustrative examples set forth herein, the probability density function $u_\lambda$ is selected to be a Gaussian mixture model (GMM). See, e.g. Perronnin 2007. Here $$u_\lambda = \sum_{i=1}^{K} \omega_i u_i(x)$$

and the parameters are $\lambda=\{\omega_i, \mu_i, \Sigma_i, i=1, \ldots, K\}$, where $\omega_i$, $\mu_i$, and $\Sigma_i$ are respectively the mixture weight, mean vector, and covariance matrix of the Gaussian $\mu_i$. In the exemplary case, therefore, the GMM $$u_\lambda = \sum_{i=1}^{K} \omega_i u_i(x)$$

models the generation process of the local descriptors (i.e., probabilistic visual vocabulary).

It can be assumed that the covariance matrices $\Sigma_i$ are diagonal and the thus corresponding variance vector is denoted as $\sigma_i^2$. The GMM $$u_\lambda = \sum_{i=1}^{K} \omega_i u_i(x)$$

is trained on a set of training set of images using a suitable training algorithm such as maximum likelihood (ML) estimation. The number of Gaussians in the GMM can be at least 10, e.g., at least 100 and can be up to 100,000 and in one embodiment, is less than 1,000, such as about 100-200.

The features X can then be described by a gradient vector. The FV $G$ characterizes the set $X=\{x_t, t=1 \ldots T\}$ by its deviation from the distribution $u_\lambda$:

$$G = L_\lambda G_\lambda^X. \quad (1)$$

where $G_\lambda^X$ is the gradient of the log-likelihood with respect to $\lambda$:

$$G_\lambda^X = \frac{1}{T} \nabla_\lambda \log u_\lambda(X). \quad (2)$$

and $L_\lambda$ is the Cholesky decomposition of the inverse of the Fisher information matrix $F_\lambda$ of $u_\lambda$, i.e., $F^{-1}=L_\lambda'L_\lambda$ where by definition:

$$F=F_\lambda=E_{x \sim u_\lambda}[\nabla_\lambda \log u_\lambda(x) \nabla_\lambda \log u_\lambda(x)']. \quad (3)$$

Learning a kernel classifier is equivalent to learning a linear classifier on the Fisher vectors $G$. Learning a linear classifier with such image representations can be done efficiently.

Further details on the generation of FV representations are provided, for example, in U.S. application Ser. No. 12/859,898 and Perronnin 2010. As shown in these references, square-rooting and L2-normalizing of the FV can greatly enhance the classification accuracy.

In embodiments employing image partitioning, for example the illustrative embodiment employing the spatial pyramid, a Fisher vector representation is generated for each partition in accordance with Equation (1). These Fisher vectors are concatenated to generate an image representation.

3. Combining Image Representations with Other Features

While the exemplary FV or BOV image representation can be sufficient, of itself to classify the image 12 in terms of quality, in other embodiments, image classification can also be a function of other features, such as one or a set of aesthetic features, such as those of Datta, et al., and/or semantic features extracted from the image and/or from associated metadata. In this case, the other features and BOV/FV vector may be concatenated to form an image representation (optionally, with the features weighted to provide more or less weight to the BOV/FV vector). Alternatively, the scores output by classifiers specific to each type of image representation may be combined in a late fusion technique by aggregating component 114. For example, the BOV/FV representation is input to a first classifier which outputs a first score and the aesthetic features are input to a second classifier which outputs a second score and the first and second scores are aggregated, e.g., by taking a weighted average of the two scores.

Methods for generation of a representation of the semantic content of an image are described, for example, in U.S. Pub. No. 2007005356, published Jan. 4, 2007, entitled GENERIC VISUAL CATEGORIZATION METHOD AND SYSTEM, by Florent Perronnin; U.S. Pub. No. 20070258648, published Nov. 8, 2007, entitled GENERIC VISUAL CLASSIFICATION WITH GRADIENT COMPONENTS-BASED DIMENSIONALITY ENHANCEMENT, by Florent Perronnin; U.S. Pub. No. 20080069456, published Mar. 20, 2008, entitled BAGS OF VISUAL CONTEXT-DEPENDENT WORDS FOR GENERIC VISUAL CATEGORIZATION, by Florent Perronnin; U.S. Pub. No. 20080317358, published Dec. 25, 2008, entitled CLASS-BASED IMAGE ENHANCEMENT SYSTEM, by Marco Bressan, et al.; U.S. Pub. No. 20090144033, published Jun. 4, 2009, entitled OBJECT COMPARISON, RETRIEVAL, AND CATEGORIZATION METHODS AND APPARATUSES, by Florent Perronnin, et al.; U.S. Pub. No. 20100040285, published Feb. 18, 2010, entitled SYSTEM AND METHOD FOR OBJECT CLASS LOCALIZATION AND SEMANTIC CLASS BASED IMAGE SEGMENTATION, by Gabriela Csurka, et al.; U.S. Pub. No. 20100092084, published Apr. 15, 2010, entitled REPRESENTING DOCUMENTS WITH RUN-LENGTH HISTOGRAMS, by Florent Perronnin, et al.; U.S. Pub. No. 20100098343, published Apr. 22, 2010, entitled MODELING IMAGES AS MIXTURES OF IMAGE MODELS, by Florent Perronnin, et al.; U.S. Pub. No. 20100318477, published Dec. 16, 2010, entitled FAST AND EFFICIENT NONLINEAR CLASSIFIER GENERATED FROM A TRAINED LINEAR CLASSIFIER, by Florent Perronnin, et al., U.S. application Ser. No. 12/512,209, filed Jul. 30, 2009, entitled COMPACT SIGNATURE FOR UNORDERED VECTOR SETS WITH APPLICATION TO IMAGE RETRIEVAL, by Florent Perronnin, et al.; U.S. application Ser. No. 12/693,795, filed Jan. 26, 2010, entitled A SYSTEM FOR CREATIVE IMAGE NAVIGATION AND EXPLORATION, by Sandra Skaff, et al.; U.S. application Ser. No. 12/960,018, filed Dec. 3, 2010, entitled LARGE-SCALE ASYMMETRIC COMPARISON COMPUTATION FOR BINARY EMBEDDINGS, by Albert Gordo, et al.; Perronnin, F., Dance, C., "Fisher Kernels on Visual Vocabularies for Image Categorization," in Proc. of the IEEE Conf on Computer Vision and Pattern Recognition (CVPR), Minneapolis, Minn., USA (June 2007); Yan-Tao Zheng, Ming Zhao, Yang Song, H. Adam, U. Buddemeier, A. Bissacco, F. Brucher, Tat-Seng Chua, and H. Neven, "Tour the World: Building a web-scale landmark recognition engine," IEEE Computer Society Conference, 2009; Herve Jegou, Matthijs Douze, and Cordelia Schmid, "Improving Bag-Of-Features for Large Scale Image Search," in IJCV, 2010; G. Csurka, C. Dance, L. Fan, J. Willamowski and C. Bray, "Visual Categorization with Bags of Keypoints," ECCV Workshop on Statistical Learning in Computer Vision, 2004; Herve Jegou, Matthijs Douze, and Cordelia Schmid, "Hamming embedding and weak geometric consistency for large scale image search," in ECCV 2008; Jorma Laaksonen, Markus Koskela, and Erkki Oja, "PicSOM self-organizing image retrieval with MPEG-7 content descriptions," IEEE Transactions on Neural Networks, vol. 13, no. 4, 2002, the disclosures of all of which are incorporated herein in their entireties by reference.

Exemplary aesthetic features which may be combined with the exemplary BOV and FV representations to provide an image quality score include low-level features such as those which describe light and color using simple statistics evaluated over the entire image. In particular, mean and standard deviation can be computed for each color channel in several perceptually and non-perceptually coherent color spaces such as Lab, RGB, YUV or HSV. Other aesthetic descriptors are based on blur estimation techniques, where a blurred image is modeled as the result of Gaussian smoothing filter applied to an otherwise sharp image (see, e.g., H. Tong, "Blur detection for digital images using wavelet transform," *Proc. IEEE Intern'l Conf. on Multimedia and Expo*, pp. 17-20, 2004). Other low level features which can be used are those which calculate the dynamic range of an image by evaluating its gray-scale histograms. Additionally, colorfulness can be assessed by extracting 3-D color histograms and by calculating their Earth Mover Distance from a reference chromatic model.

The Classifier System

The exemplary classifier system 18 is trained on the image representations 56 and corresponding quality values 54 of the set of training images 100. Once trained, the classifier system receives as input the image representation 16, such as the BOV representation or Fisher vector of a new image 12, and outputs a measure of image quality based thereon. The measure can be a quality score q for the image 12, which can be used alone as its quality value 20. Alternatively, the quality value 20 may also be based on additional information.

Where two or more different types of low level feature are used, such as SIFT and color, two classifiers 110, 112 may be used as the classifier 18 (FIG. 2). A separate classifier score may thus be obtained for each image representation and the final result (quality score) can be obtained (by aggregating component 114) by aggregating the two (or more) scores with late fusion, i.e., averaging the scores of the two systems 110, 112 (e.g., with equal weights or different weights). Alternatively, the two (or more) image representations, one for color and one for SIFT, are combined, e.g., concatenated, to form a single image representation, which is input to a single classifier.

The classifier system 18 may include one or more binary classifier(s) trained with any suitable linear or non-linear training algorithm, such as sparse logistic regression, naïve Bayes, linear discriminant analysis, random forests (decision trees), support vector machines (SVM), using a suitable classification function, such as linear or radial basis function (RBF) kernels, Perceptrons, or polynomials, linear regression, or any other suitable machine learning method. In the exemplary embodiment, SVM using radial basis function (RBF) kernels is used. This allows a direct comparison with the results of existing methods. However, it is to be appreciated that other classifier learning methods are also contemplated.

Use of Quality Values

The quality values 20 output by the system 10 may be used (at S126) in a variety of applications. For example, the quality score 20 may be used in an information retrieval process where the quality score 20 of an image 12 may be used, alone or in combination with other parameters, to rank a set of such images 12 retrieved by a search engine in response to a query input by a user. In this embodiment, each image 12 in the set has a quality score 20 and the higher the score, the more likely the image is to be among those presented first to the user, based on this parameter.

In another embodiment, the quality value 20 may be used to display images on a display 92 in an arrangement which is based on the quality value (e.g., highest scoring image(s) is/are shown first).

In yet another embodiment, at least one but fewer than all of a set of images 12 which have each been assigned a quality value 20 by the system is selected, based on its quality value. For example, an image may be selected for pasting into a document, generating web content, or the like. For example the highest scoring image(s) in a set of relevant images is/are selected.

In another embodiment, a user's image collection may be assigned tags which are based on the scores 20, e.g., a star rating of 1-5 stars. A user can then retrieve, for example, those images which have a star rating of at least 4 or at least 5, for example.

In another embodiment, the quality scores 20 may be used to select a set of images to be used in training a new categorizer. For example, only those images 12 with at least a threshold image quality score may be input to a categorizer. The categorizer may be a semantic categorizer which assigns a semantic label to images based on image content or assigns all labels in a set probabilistically to the image. The labels are selected from a predefined set of labels, such as flower, person, landscape, etc.

In another embodiment, the trained classifier system 18 may be deployed directly in photographic cameras to make real-time suggestions to a user, even before an image 12 is captured. For example, the image 12 in the camera's view is processed and a quality score is determined. The camera may provide a warning on its screen if the image 12, when captured, is likely to be of poor quality (e.g., is below a threshold).

Without intending to limit the scope of the exemplary embodiment, the following example demonstrates an implementation of the exemplary method showing that the BOV and FV are useful for aesthetic prediction.

Example

A prototype system 10 was implemented as described above.

Image Data Sets:

For the training images 100 and images 16, the following two public databases derived from the photo.net website were used:

Photo.net 1 dataset (PN1): This database is a set of 3,581 randomly chosen photographs from the public website photo.net. However, since some hyperlinks to the original images are no longer active, only 3,118 of these images were available for download. These images were used in the test. The images in the Photo.net 1 dataset are scored with values between 1.0 and 7.0 (7 being the highest quality score) and multiple votes per image are possible. The subjects of the images are highly heterogeneous. PN1 was used in the experiments described in Datta 2006 and Datta 2007.

Photo.net 2 dataset (PN2): This is a larger version of PN1 provided by the authors of Datta 2006. It consists of a total of 20,278 images of which only 17,036 are accessible. Besides the size, a difference with PN1 is that PN2 only contains images which received at least 10 ratings. This ensures a greater stability of the averaged image quality scores 54.

For each image i, the average of the scores 38 available for this image $q_{av}(i)$ is computed. Two thresholds $\theta_1 = 5+\delta/2$ and $\theta_2 = 5-\delta 2$ are set. Each image is annotated with the label "good"=+1 if $q_{av}(i) \geq \theta_1$ and "bad"=−1 if $q_{av}(i) \leq \theta_2$. These binary quality values 54 were used in training the classifier system and in measuring accuracy.

Aesthetic Features:

As aesthetic features for comparison purposes, the features listed for aesthetic classification described in Datta 2006 (56 features) and Ke 2006 (7 features), were used. In the following examples, $Datta_{all}$ refers to all of the 56 Datta features. Ke refers to all of the 7 Ke 2007 features. $Datta_{top15}$ refers to the top 15 features of Datta 2006. Ke+$Datta_{top15}$ refers to the top 15 features of Datta 2006 and Ke 2006 combined.

The results reported in Datta 2006 and Ke were able to be replicated using the same experimental protocols and datasets.

Content-Based Features:

For BOV and FV, two types of local descriptors: 128-dimensional SIFT descriptors (as described above and in Lowe 2004) and 96-dimensional color descriptors (Perronnin 2010) were used to describe patches. In both cases, the local descriptors were reduced with PCA to 64 dimensions. Local descriptors are extracted regularly on grids every 16 pixels from 32×32 pixel patches at multiple scales (i.e., by downsizing the image). The probabilistic visual vocabulary, i.e., a GMM, is learned using a standard EM algorithm. For the BOV, a GMM with 2,048 Gaussian functions is used, and for the FV, a GMM with 128 Gaussian functions is used.

Classification:

On both PN1 and PN2 datasets, 5-fold cross-validation was performed, as suggested in Datta 2006. A Sparse Logistic Regression (SLR) classifier was used, which has been shown to perform similarly to the SVM classifier (see B. Krishnapuram, L. Carin, M. Figueiredo, and A. Hartemink, "Sparse multinomial logistic regression: Fast algorithms and generalization bounds," *IEEE TPAMI*, 2005). For the BOV and FV, two separate classifiers 110, 112 were run, one for SIFT and one for color features. For the aesthetic quality of the image, the image was simply classified as "good" or "bad" using discriminative classifiers trained using the BOV and FV descriptors, respectively, of the training folds of images along with their respective aesthetic "good" and "bad" labels. The final result (quality score) for a test image is simply obtained with late fusion, i.e., averaging the scores of the two classifiers 110, 112 (here, with equal weights).

Experiments on PN1

In the following experiments, accuracy was measured as the percentage of images in the testing set which were correctly classified, based on their quality score, averaged over the five folds.

Figure 5:
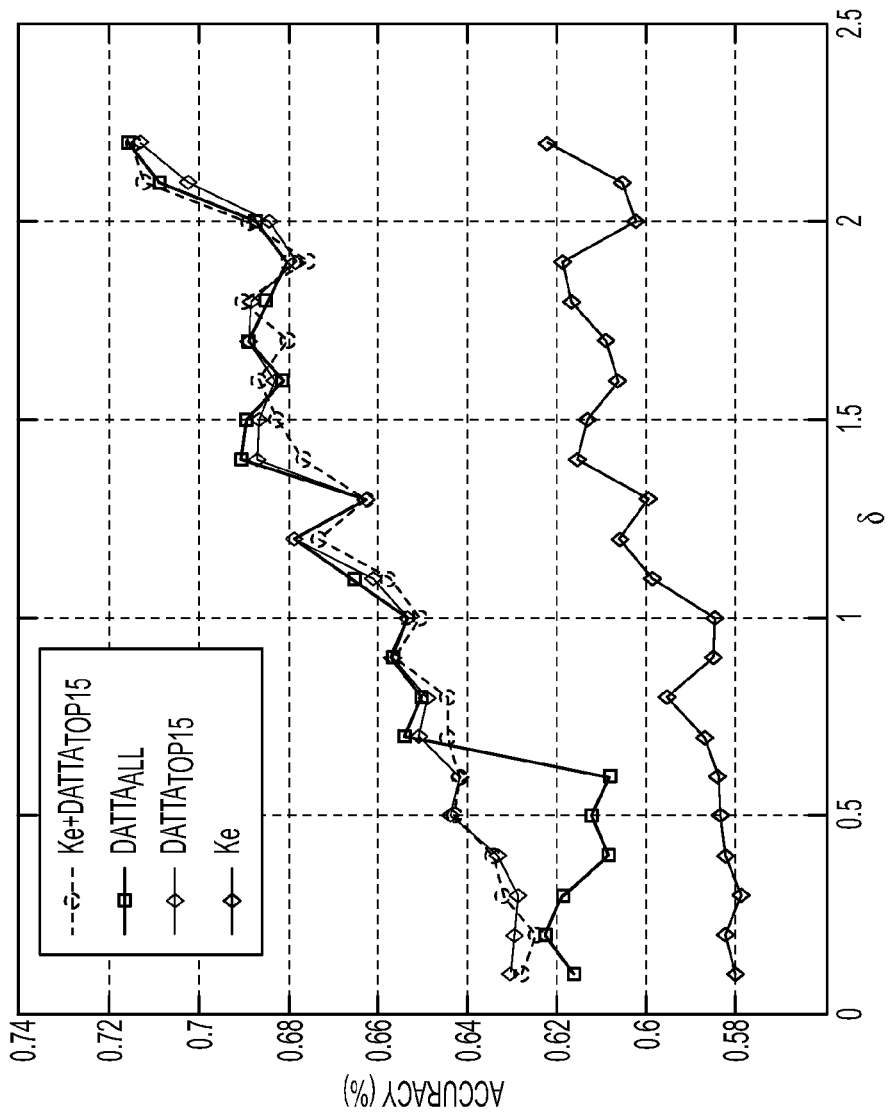
FIG. 5 is a plot showing accuracy results generated by a set of comparative methods.

To establish an aesthetic features baseline, different sets of features were evaluated on the PN1 dataset. FIG. 5 shows plots of classifier accuracy vs. rating threshold 3 for the aesthetic features sets: $Datta_{all}$, $Datta_{top15}$, Ke, and Ke+$Datta_{top15}$. It can be seen from FIG. 5 that the Datta 2006 features outperform the Ke features and that there is a limited difference between the $Datta_{all}$ features and the selected $Datta_{top15}$ features. The merged Ke+$Datta_{top15}$ features provided no significant improvement. In the remainder of the experiments, the best 15 features proposed by Datta 2006 ($Datta_{top15}$) were therefore used as the baseline.

Figure 6:
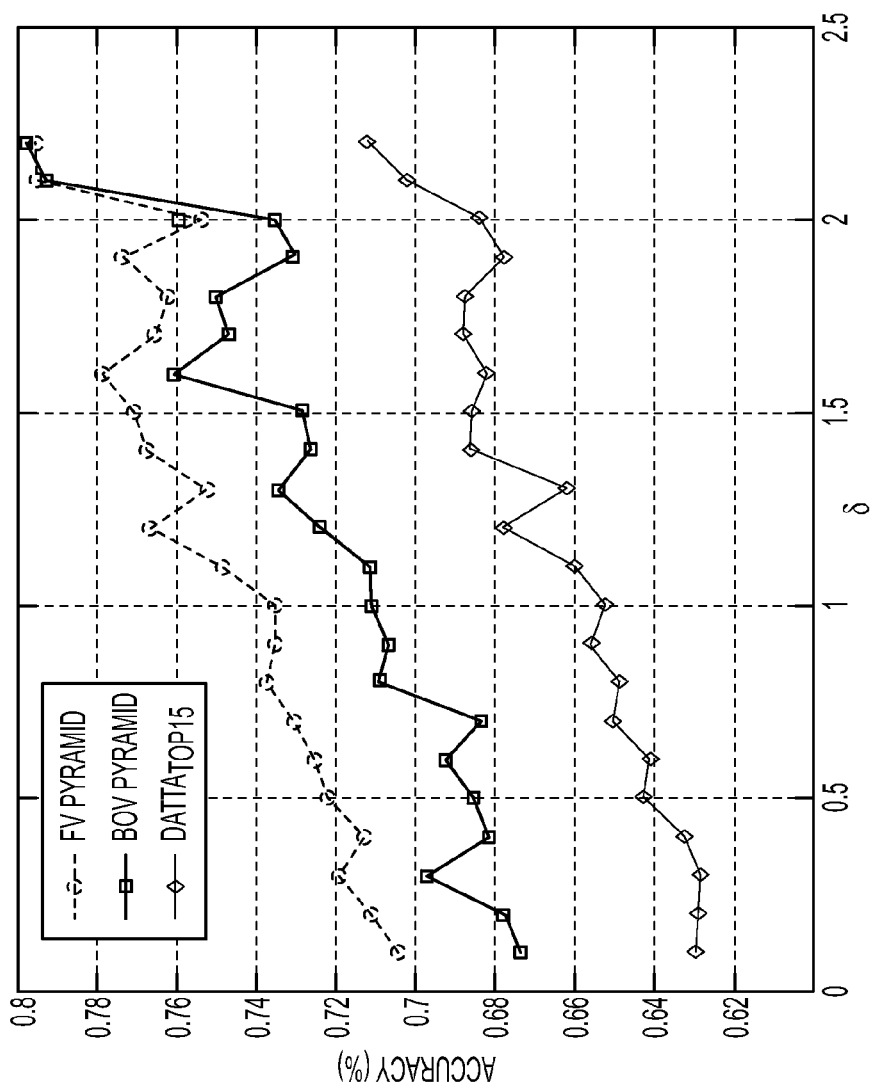
FIG. 6 is a plot showing accuracy results generated by the exemplary method using Fisher Vector (FV) and Bag-of-Visual word (BOV) image representations and results for one of the comparative methods, using the PN1 dataset for training and testing.

FIG. 6 shows the impact of the spatial pyramid on classification accuracy on the PN1 dataset using the BOV and FV descriptors, with the $Datta_{top15}$ results shown for comparison. It can be seen that the BOV and FV descriptors used as image representations outperform the conventional aesthetic features over all the rating thresholds $\delta$ tested. Thus, it can be concluded that the FV and the BOV distributions of local descriptors have a high potential for discrimination for image quality assessment. Of the two, FV is the best performing descriptor.

Figure 7:
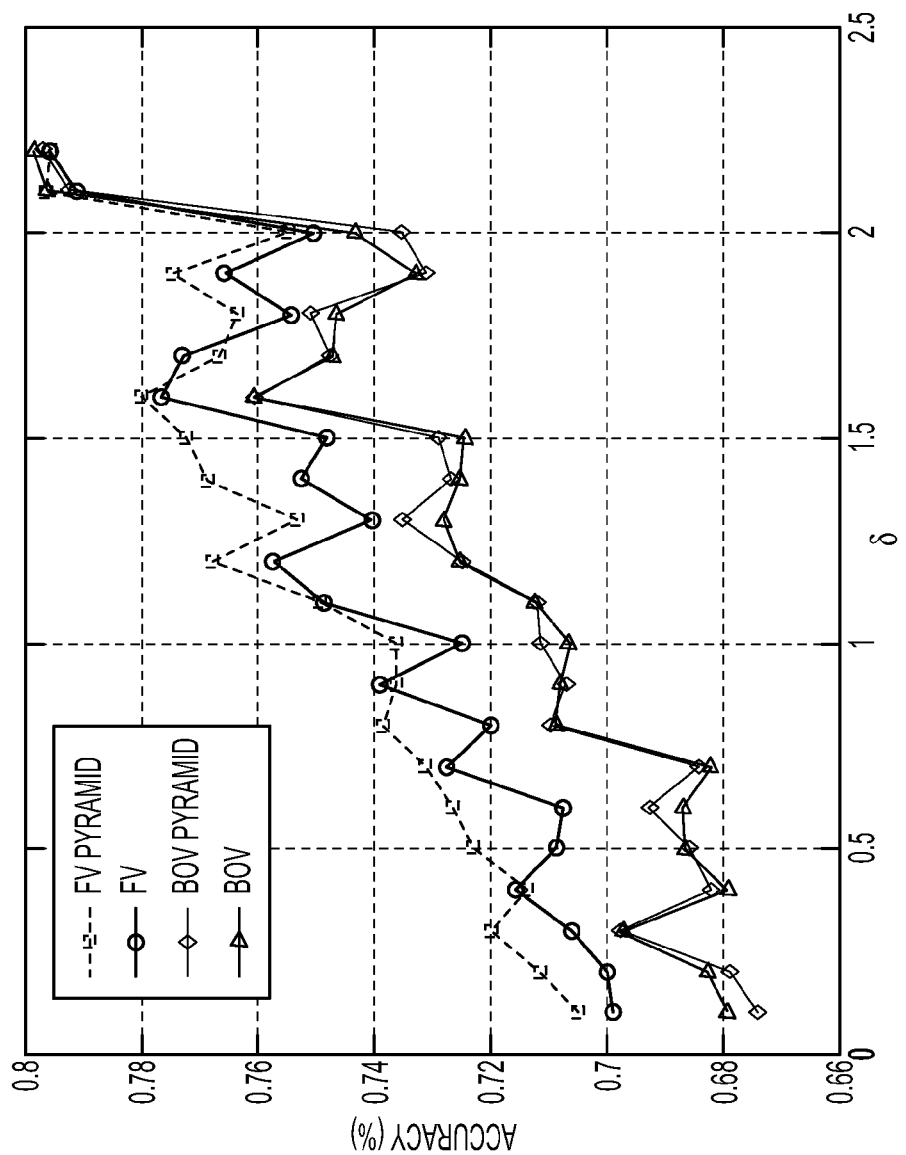
FIG. 7 is a plot showing accuracy results generated by the exemplary method for the FV and BOV image representations with and without partitioning of the image with a spatial pyramid partitioning model, using the PN1 dataset.

FIG. 7 shows the effect of the spatial pyramid on BOV and FV scores (using 8 concatenated region descriptors per feature type, as described for FIG. 4). It can be seen that the impact is most significant in the case of FV descriptors. This may be because relatively few training samples were used and the dimensionality of the descriptors with the spatial pyramid is much larger than without. In other words, it may be expected that spatial pyramids could yield a higher increase in the case where more training data is available.

The complementarity of the best content-based descriptors (the FV) with the Datta features ($Datta_{top15}$) was also assessed. FIG. 7 shows results for late fusion (with equal weights) of these two systems as "FV pyramid+Datta." A limited (but consistent) improvement of the accuracy can be observed, which tends to indicate that there is little complementarity between these descriptors, although the improvement in accuracy may warrant using both types of descriptor in image quality assessment.

A comparison of the results disclosed in copending application Ser. No. 13/089,460 was also made. In this application, traditional aesthetic features, such as those of Datta, are combined with semantic features. For the comparison, 7 broad semantic classes: landscape, people, urban, animal, object, flower and other were used: the semantic vector of a given image is thus a 7-dim vector which indicates the relevance of each class. The optimistic case was considered, where there is perfect knowledge of the semantic information and each image is represented as a 7-dimensional binary vector with a value 1 in the dimension corresponding to its class index and zero in all other dimensions. This vector was concatenated with the vector of Datta features and the resulting mixed aesthetic-semantic vector was input to a discriminative classifier.

The FV, even without the spatial pyramid, significantly outperforms the other method over the range of rating thresholds $\delta$ tested (as for FIG. 7), even in the case where we have a perfect knowledge of the semantic information.

Experiments on PN2

Figure 8:
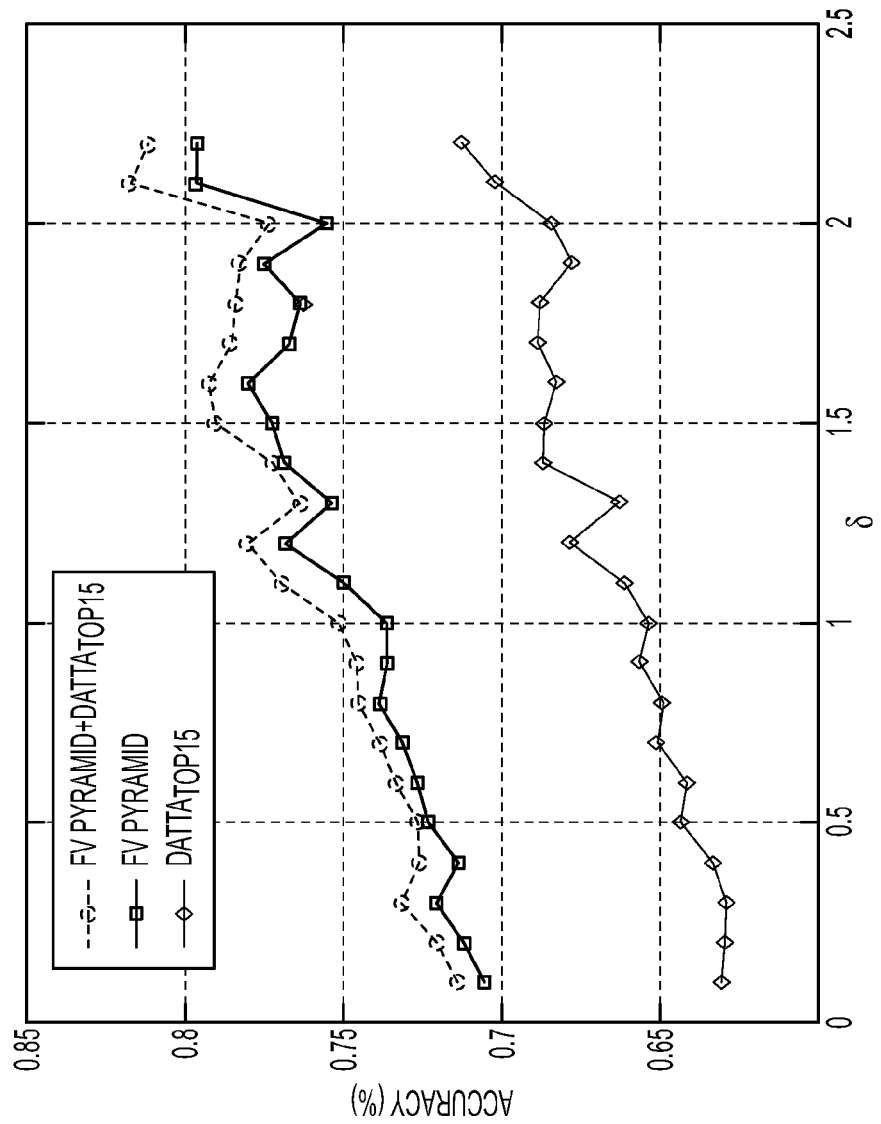
FIG. 8 is a plot showing accuracy results generated by the exemplary method when the FV image representations formed by partitioning of the image with a spatial pyramid partitioning model are combined with aesthetic features (FV pyramid+Datta$_{top15}$), using the PN1 dataset.
Figure 9:
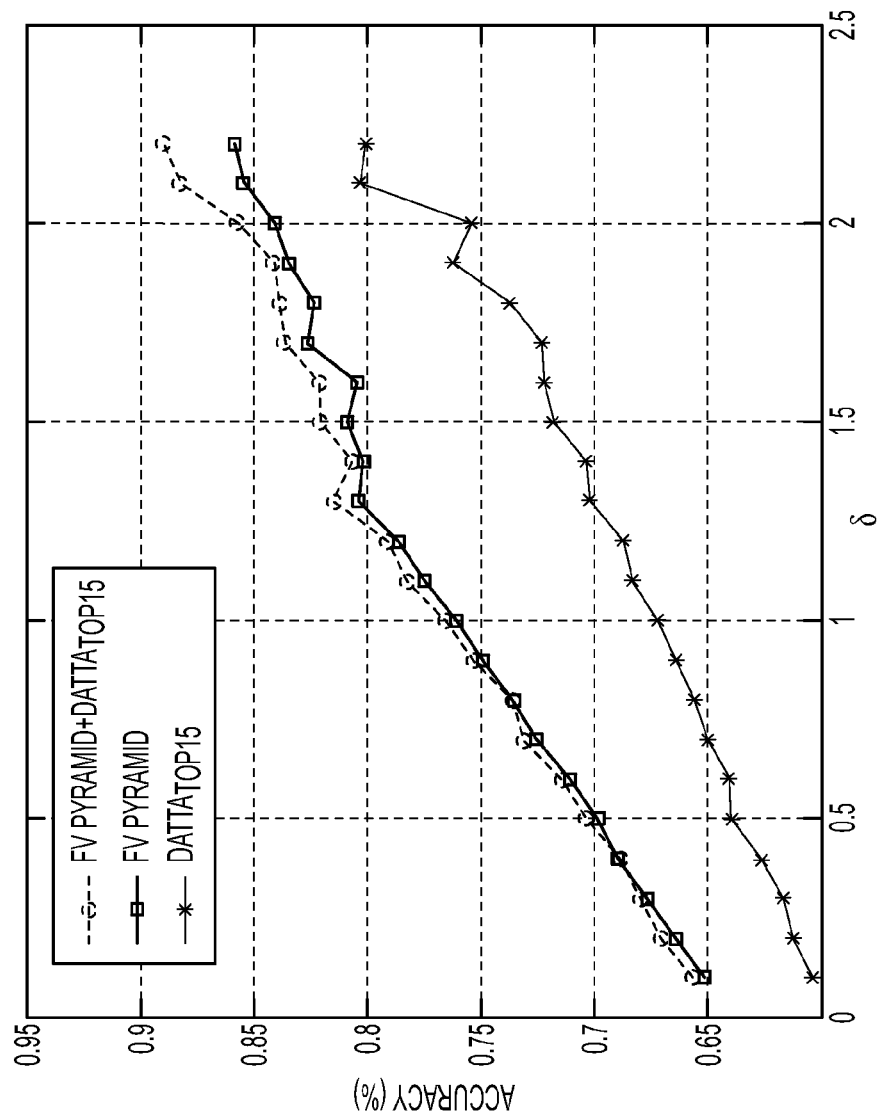
FIG. 9 is a plot showing accuracy results generated by the exemplary method when the FV image representations formed by partitioning of the image with a spatial pyramid partitioning model are combined with aesthetic features, using the PN2 dataset for training and testing.

FIG. 9 shows analogous results to FIG. 8, but with the PN2 database, i.e., using aesthetic features (Datta), content-based features (FV with spatial pyramid) and their combination. Here, it can be seen that the FV descriptor significantly outperforms the Datta features and there is little to be gained by combining these two classes of features.

The results demonstrate that it is possible to assess the aesthetic quality of an image from its distribution of low-level local features. An image can be described by a BOV or FV vector and classified as "good" or "bad" using discriminative classifiers 110, 112 trained on images with aesthetic labels. Surprisingly, the exemplary BOV and FV can outperform features specifically developed to correlate with photographic techniques.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for determining the aesthetic quality of an input image, comprising:
   extracting a set of local features from the input image, the extracting comprising, for each of a set of patches of the image, generating a local descriptor based on low level features of pixels in the patch;
   with a processor, generating an image representation which describes the distribution of the local features, the generating of the image representation comprising modeling the local descriptors using a probabilistic model, whereby the input image representation comprises probabilistic model component values for a set of probabilistic model components; and
   with a classifier system, determining an aesthetic quality of the input image based on the computed image representation.

2. The method of claim 1, wherein the image representation comprises an aggregation of the local descriptors.

3. The method of claim 1, wherein the low level features comprise at least one of gradient and color features.

4. The method of claim 1, wherein the probabilistic model comprises a Gaussian mixture model and the probabilistic model components comprise Gaussian components of the Gaussian mixture model.

5. The method of claim 4, wherein the probabilistic model components comprise components of a gradient vector $\nabla_\lambda f_\lambda(X)$ where X denotes the local descriptors extracted from the input image and $f_\lambda(X)$ denotes a probability function parameterized by parameters $\lambda$.

6. The method of claim 1, wherein the generating comprises:
   partitioning the input image into a plurality of image regions using a spatial pyramids partitioning model;
   extracting region descriptors from the image regions based on the extracted set of local features for the region; and
   aggregating the local descriptors extracted from the image regions.

7. The method of claim 6, wherein the image representation comprises at least one concatenated Fisher vector representation of the region descriptors extracted from the image regions.

8. The method of claim 1, wherein the classifier system is trained on an aesthetic quality value for each of a set of training images and corresponding image representations.

9. The method of claim 8, wherein the aesthetic quality value of a training image is computed by averaging a plurality of manually-assigned image quality scores for the training image.

10. The method of claim 9, wherein the aesthetic quality values of the training images are binarized values.

11. The method of claim 1, further comprising training the classifier comprising:
   receiving a set of training images, each of the training images having at least one manually assigned image quality score;
   for each training image:
      assigning an image quality value to each training image based on its at least one image quality score,
      extracting a set of local features from the training image,
      generating an image representation which describes the distribution of the local features of the training image; and
   training the classifier system with the image representations and aesthetic quality values of the training images.

12. The method of claim 11, further comprising filtering a larger set of training images to identify the set of training images, the filtering being based on the at least one manually assigned image quality score.

13. The method of claim 1, wherein the input image comprises a photographic image.

14. A computer program product comprising a non-transitory storage medium encoding instructions, which when executed by a computer, perform the method of claim 1.

15. A system comprising non-transitory memory which stores instructions for performing the method of claim 1 and a processor in communication with the memory, for executing the instructions.

16. A method for determining the aesthetic quality of an input image, comprising:
   extracting a set of local features from the input image;
   with a processor, generating an image representation which describes the distribution of the local features, the image representation comprising at least one of a bag-of-visual words (BOV) representation and a Fisher vector (FV) representation; and
   with a classifier system, determining an aesthetic quality of the input image based on the computed image representation.

17. A method for determining the aesthetic quality of an input image, comprising:
   extracting a set of local features from the input image;
   with a processor, generating an image representation which describes the distribution of the local features, the generating comprising:
      partitioning the input image into a plurality of image regions using a spatial pyramids partitioning model, the partitioning comprising partitioning the input image into exactly three vertically-spaced regions and extracting a region descriptor from each of the three regions,
      extracting region descriptors from the image regions based on the extracted set of local features for the region, and
      aggregating the local descriptors extracted from the image regions; and
   with a classifier system, determining an aesthetic quality of the input image based on the computed image representation.

18. A system for determining the aesthetic quality of an input image, comprising:
   a feature extractor for extracting a set of local features from patches of the input image, the extracting comprising, for each of a set of patches of the image, extracting low level features of pixels in the patch and generating a local descriptor based on the low level features of the pixels in the patch;
   a representation generator for generating an image representation which describes a distribution of the extracted local features, the representation generator modeling the local descriptors using a probabilistic model, whereby the input image representation comprises probabilistic model component values for a set of probabilistic model components; and
   a classifier system, which determines an aesthetic quality of the input image based on the computed image representation.

19. The system of claim 18, wherein the representation generator generates a first image representation which describes a distribution of a first type of extracted local features and a second image representation which describes a distribution of a second type of extracted local features and wherein the classifier system comprises a first classifier which computes a first score based on the first image representation and a second classifier which computes a second score based on the second image representation and an aggregating component which determines the aesthetic quality by aggregating the first and second scores.

20. A method comprising:
    for each of a set of training images:
        partitioning the training image into a plurality of image regions using a spatial pyramids partitioning model;
        extracting local descriptors from each of the image regions;
        modeling the extracted local descriptors of each image region using a probabilistic model to generate a corresponding region representation comprising probabilistic model component values for a set of probabilistic model components, the modeling comprising generating the image region representation of the local descriptors of each image region as a Fisher vector representation;
        combining the region representations to generate an image representation for the training image, the combining comprising concatenating the Fisher vector representations to generate the training image representation;
        computing an image quality value for the training image based on at least one manually-assigned aesthetic score for the training image;
    training a classifier system to determine an aesthetic quality of an input image based on its computed image representation, the training including applying a linear or non-linear training algorithm to the image quality values and image representations of the training images; and
    wherein the modeling and training are performed by a digital processor.

21. The method of claim 20, wherein the partitioning includes partitioning the image into three vertically spaced regions, each of one third of a height of the image.

22. A computer program product comprising a non-transitory storage medium encoding instructions, which when executed by a computer, perform the method of claim 20.

* * * * *